(12) United States Patent
Spivey, Jr.

(10) Patent No.: US 7,940,184 B2
(45) Date of Patent: May 10, 2011

(54) INTEGRATED CIRCUIT AND METHOD TO SECURE A RFID TAG

(76) Inventor: John William Spivey, Jr., Matthews, NC (US)

( * ) Notice: Subject to any disclaimer, the term of this patent is extended or adjusted under 35 U.S.C. 154(b) by 216 days.

(21) Appl. No.: 12/228,616

(22) Filed: Aug. 14, 2008

(65) Prior Publication Data

US 2010/0039265 A1 Feb. 18, 2010

(51) Int. Cl.
*H04Q 5/22* (2006.01)
*H04L 9/32* (2006.01)
*G08B 13/14* (2006.01)

(52) U.S. Cl. ........... 340/572.8; 340/572.1; 340/10.1; 340/5.6; 235/375

(58) Field of Classification Search .............. None
See application file for complete search history.

(56) References Cited

U.S. PATENT DOCUMENTS

| | | | |
|---|---|---|---|
| 7,212,125 B2 * | 5/2007 | Shanks et al. .......... | 340/572.7 |
| 2004/0113790 A1 | 6/2004 | Hamel et al. | |
| 2006/0055620 A1 | 3/2006 | Oliver et al. | |
| 2006/0267737 A1 | 11/2006 | Colby | |
| 2006/0289657 A1 | 12/2006 | Rosenberg | |
| 2007/0046369 A1 | 3/2007 | Schober et al. | |
| 2007/0075147 A1 | 4/2007 | Ng | |
| 2007/0229271 A1 * | 10/2007 | Shionoiri et al. ........ | 340/572.1 |
| 2009/0152364 A1 | 6/2009 | Spivey, Jr. | |
| 2009/0153236 A1 | 6/2009 | Kneepkens et al. | |

FOREIGN PATENT DOCUMENTS

| | | |
|---|---|---|
| JP | 2003022429 A | 1/2003 |
| JP | 2006216083 A | 8/2006 |
| KR | 1020080067920 A | 7/2008 |
| WO | 2010019851 A2 | 2/2010 |

OTHER PUBLICATIONS

"International Search Report" and "Written Opinion of the International Search Authority" (Korean Intellectual Property Office) in Spivey Technologies, LLC. et al., International Patent Application Serial No. PCT/US2009/053831, Applicant's file reference 3030.005, filed Aug. 14, 2009, completed Feb. 25, 2010, mailed Feb. 26, 2010, 8 pages.

Information Disclosure Statement (IDS) Letter Regarding Common Patent Application(s), dated Nov. 2, 2010.

* cited by examiner

*Primary Examiner* — Julie Lieu
(74) *Attorney, Agent, or Firm* — Tillman Wright, PLLC; James D. Wright; Chad D. Tillman

(57) ABSTRACT

A method to secure RFID card information consisting of a piezo electric element coupled to a transistor which is coupled across the antenna leads of a RFID tag, the transistor provides a short circuit or and open circuit across the antenna leads or antenna input leads of a the RFID chip. The transistor when not energized provides a short circuit on the RFID antenna. When the transistor is energized by a piezo electric element the short circuit is removed and the RFID chip can transfer data normally. Furthermore, the present invention includes a single integrated circuit package, being a single integrated transistor RFID chip package based on the transistor circuit design to operate specifically with a piezo electric element when used with a RFID tag.

6 Claims, 1 Drawing Sheet

INTEGRATED CIRCUIT AND METHOD TO SECURE A RFID TAG

BACKGROUND

Integrated circuit and method to secure RFID tag, RFID tags are used in credit cards, transaction cards and security access badges, securing the data stored on the RFID chip is of the utmost importance. To date credit cards, transaction cards, security access badges, passports, and other card forms of ID cards are available with RFID tag technology, however RFID tag technology is currently plagued with security risks. The main problem with RFID technology applications is securing of the RFID tag information (data) stored on the chip which can be read anytime the card passed near a RFID reader terminal, making RFID technology highly insecure and prone to being easily hacked and the card information being stolen.

Furthermore, the RFID information can be read at long distances without the card holder's knowledge, even when the user has the card secured in a wallet or handbag. Methods have been taken by manufacturers to issue shielding sleeves for RFID credit cards, transaction cards and security access cards as a safe guard to block the RF signal. However, most individuals loose the sleeve or find it too inconvenient to return the card to the shielding sleeve to secure the RFID tag based card.

The present invention discloses a circuit and method to secure RFID tag data. The present invention allowing (data) stored on the RFID chip to only be read when the card holder activates the RFID circuit by deflecting or bending a piezo element. The present invention does not allow the RFID reader terminal access to the RFID chip information until the card holder bends or deflects the piezo which is retained by the RFID tag or card material. Bending or deflecting the piezo electric element will release energy measurable in volts of energy, energizing the "gate" of a JFET, MOSFET or similar component of the transistor family. Basic operation of a JFET is an electronic switch capable of "on" "off" conditions or often referred to as a closed or open circuit condition. In a JFET or MOSFET electric current flows from one connection, called the source, to a second connection, called the drain, when current flows this is a (closed/short circuit condition) effect of switching "on" the transistor state. A third connection the gate, determines how much current flows.

By applying an increasing positive (for a p-channel JFET) bias voltage at the gate, the current flow from source to drain is impeded by pinching off the channel, in effect switching "off" the transistor (open circuit condition) between the source and the drain. The present invention uses the JFET circuit with the JFET output leads referred to as a "source" and "drain" connected across the RFID antenna with no voltage applied to the "gate" closed circuit condition is created effectively applying a short circuit across the antenna of the RFID tag which does not allow the antenna to be charged by a RFID tag reader, effectively shorting out the antenna. A piezo element when bent or deflected energizes the "gate" input of the JFET switching the JFET current flow which is no longer present (open circuit condition) at the "drain" to "source" connections of the JFET. The RFID antenna, when the JFET is switched, will then be capable of being operating normally and is capable of being energized a by the RFID reader, at which time the RFID chip will transfer the information wirelessly to the RFID reader terminal. This method of applying a short circuit to the two antenna inputs on the RFID chip can be used on both active and passive RFID technologies and secure the RFID tag data from being read.

SUMMARY OF THE INVENTION

It is the object of the present invention to provide a circuit and method of securing information on a RFID tag for but not limited to RFID tags used for credit cards, transaction cards or security access badges to be read by a RFID reader only when the card holder wishes to allow the transfer of information (data) from the RFID card to a RFID reader. The present invention provides a circuit and method to secure information on a RFID card, in which the card holder initiates the transfer of the card information to the RFID card reader by flexing or slightly bending the piezo element. The credit card, transaction card or security access card retaining a piezo electric material for generating a voltage which is applied to the gate input of a JFET or similar component of the transistor family for effectively switching the JFET to and from on to off condition allowing a passive or active RFID chip to be read by a RFID tag reader.

DETAILED DESCRIPTION OF THE PREFERRED EMBODIMENTS

Figure 1:
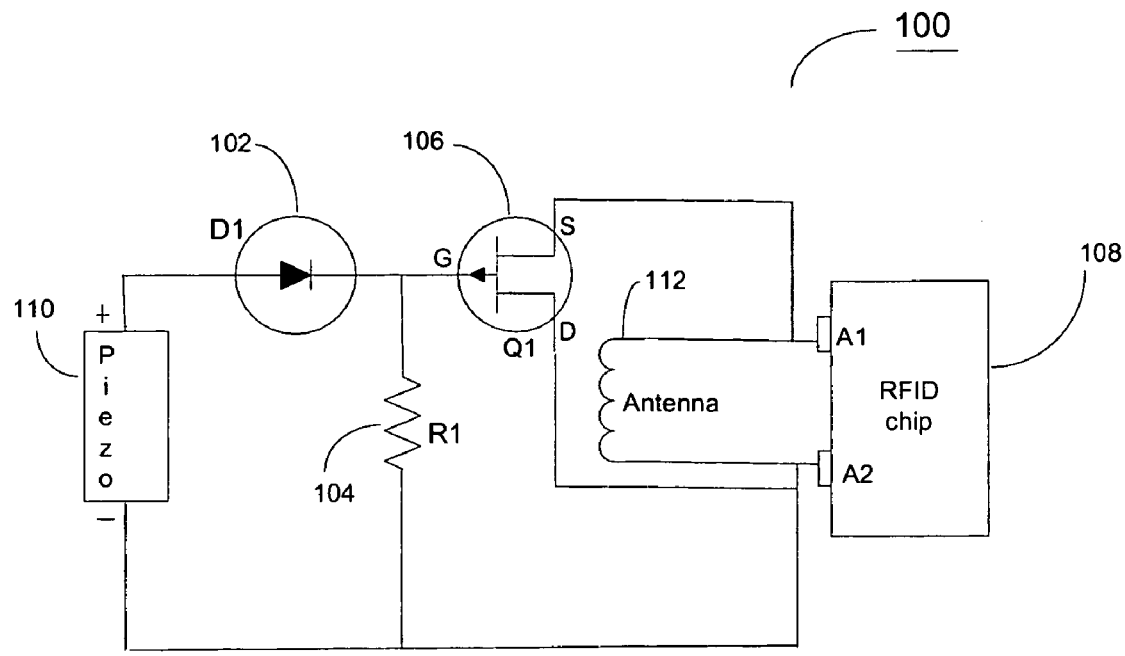
FIG. 1 is a circuit diagram of a passive RFID tag circuit in accordance with a first preferred embodiment of the present invention.

FIG. 1. at 100 shows a passive RFID tag circuit with the RFID chip 108, which contains the data information coupled to an antenna 112 and coupled to a Q1 106 which is shown as a JFET, however a MOSFET or similar transistor family component can be used; either P or N channel can be used also. The "Q1" 106 "S" source lead is coupled to the A1 antenna 112 lead, and the Q1 106 "D" drain is shown connected to the A2 antenna lead 112. The "Q1" 106 creates short circuit across the antenna leads A1 and A2 of the antenna 112. The short circuit across the antenna 112 leads does not allow the antenna to be energized by a RFID tag reader (not shown) which is the method used in passive RFID tag technologies to power the RFID chip 108. A resistor R1 104 is used to bleed any stored capacitance off the JFET and is electrically coupled to the "G" gate of the "Q1" JFET 106 and a diode "D1" 102 which is used to rectify the voltage generated by the piezo element; the diode "D1" is not required and the circuit will operate without D1. FIG. 1 shows the positive output side of the piezo element 110 is coupled to the diode "D1" 102 and the negative side of the piezo element 110 is electrically coupled to one side of the resistor "R1" 104 the "D" drain side of the "Q1" 106 and the antenna side A2 of the antenna 112, the "S" source side of the "Q1" 106 electrically coupled to the A1 antenna 112 input. When the piezo 110 is bent or deflected slightly energy voltage is generated in the form of a sinusoidal wave. The energy passes through the diode 102 which is used to regulate the piezo element 110 output voltage and enters the "G" gate input of the "Q1" 106. The energy from the piezo element energizes the "Q1" 106 in effect switching the "Q1" 106 "off" the source and drain will no longer conduct current flow and an open circuit is effectively produced between the source and drain. During the open circuit condition the antenna 112 will be capable of operating normally and can be energized by a RFID reader (not shown) and the information (data) stored in memory of the RFID chip 108 will be capable of being transmitted to a RFID reader (not shown). The open circuit condition between the source and drain will last at most a few seconds, as the resistor R1 104 will bleed off the stored capacitance at the "Q1" 106 gate, once the capacitance is bled off the "Q1" 106 will be in effect switched "on" and the short circuit will be placed across the antenna 112 securing the RFID chip 108 data from being read by a RFID tag reader (not shown).

Figure 2:
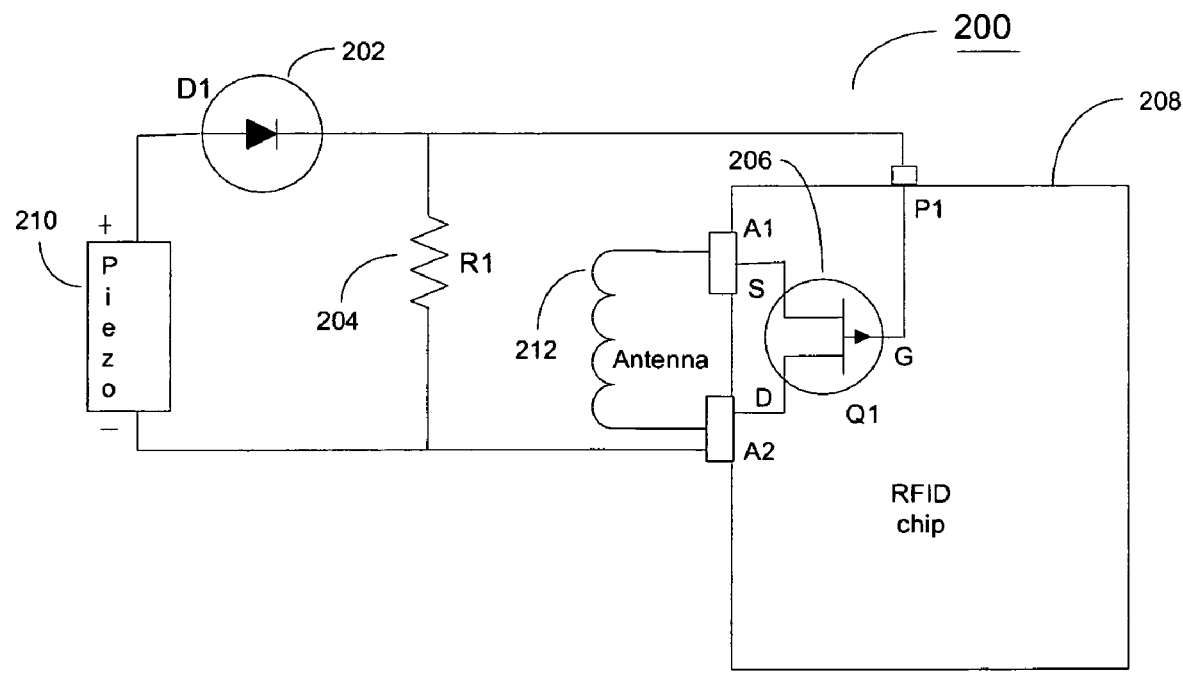
FIG. 2 is a circuit diagram of a passive RFID tag circuit in accordance with a second preferred embodiment of the present invention.

Further aspects of the present invention would be to minimize the circuit size by combining the circuit shown in FIG. 1 at 100 into a single RFID IC shown FIG. 2 at 200. The RFID IC at 200 would contain at a minimum "Q1" 206 being shown as a P channel JFET integrated into the RFID chip. The JFET can be a MOSFET or any comparable transistor N or P channel. A resistor R1 204 is used to bleed any stored capacitance off the JFET and is electrically coupled to the "G" gate of the "Q1" 206 and a diode "D1" 202 which is used to rectify the voltage generated by the piezo element, the diode "D1" is not required and the circuit will operate without D1. FIG. 1 shows the positive output side of the piezo element 210 is coupled to the diode "D1" 202 and the negative side of the piezo element 210 is electrically coupled to one side of the resistor "R1" 204 the "D" drain side of the "Q1" 1206 and the antenna side A2 of the antenna 212, the "S" source side of the "Q1" 206 is electrically coupled to the A1 antenna 212 input. When the piezo 210 is bent or deflected slightly energy voltage is generated in the form of a sinusoidal wave. The energy passes through the diode 202 which is used to regulate the piezo element 110 output voltage and enters the "G" gate input of the "Q1" 206 at P1 input. The energy from the piezo element energizes the "Q1" 206 in effect switching the "Q 1" 206 "off" the source and drain will no longer conduct current flow and an open circuit is effectively produced between the source and drain. During the open circuit condition the antenna 212 will be capable of operating normally and can be energized by a RFID reader (not shown) and the information (data) stored in memory of the RFID chip 208 will be capable of being transmitted a RFID reader (not shown). The open circuit condition between the source and drain will last at most a few seconds, as the resistor R1 204 will bleed off the stored capacitance at the "Q1" 206 gate, once the capacitance is bled off the "Q1" 206 will be in effect switched "on" and the short circuit will be placed across the antenna 212 securing the RFID chip 208 data from being read by a RFID tag reader (not shown).

What is claimed:

1. An integrated circuit to secure an RFID Tag comprising:
    a piezo electric element being retained by the flexible material of a RFID tag, said piezo electric element being an energy source for supplying energy to power a transistor; and
    a transistor having outputs coupled to the antenna leads or to the antenna inputs termination point of a RFID chip, whereby the transistor when not energized applies a short circuit between at the antenna leads or at the RFID chip antenna termination leads.

2. The integrated circuit in said claim 1, wherein in the piezo electric element capable of supplying energy to the transistor input when said piezo electric element is bent or deflected releasing said energy, said transistor is energized and the short across the RFID antenna leads and or at the RFID chip antenna termination leads creates an open circuit condition.

3. The integrated circuit in said claim 2, said open circuit condition occurs at the transistor output leads that are connected and coupled to the RFID antenna leads or at the RFID chip antenna termination leads, when said open condition of said transistor occurs the RFID antenna is capable of being energized by a RFID tag reader and said RFID tag will be capable of transferring information data to a RFID reader.

4. An integrated circuit to secure an RFID Tag comprising:
    a flexible piezo element capable of being bent and or deflected to release energy capable of energizing; and
    a transistor which output leads are coupled to at least one of the RFID antenna leads, said transistor providing a short circuit across the RFID antenna leads when said transistor is not energized and an open circuit when energized by said piezo element.

5. The integrated circuit in said claim 4, wherein said short circuit of the RFID antenna is created by said transistor when switched on, wherein a piezo electric element provides the energy to the transistor to cause an open circuit condition at the RFID antenna leads, and wherein the open circuit condition then allows the RFID chip and antenna to operate normally to transfer information to a RFID reader.

6. An integrated circuit and method to secure an RFID Tag comprising:
    an RFID integrated circuit containing a transistor in a single package die;
    said RFID integrated circuit having an output pin electrically coupled to the gate of the transistor, said transistor source and drain electrically coupled to the RFID IC antenna leads, said integrated circuit package having two leads for being coupled across a piezo electric element as a power source for said integrated circuit package.

* * * * *